United States Patent
Georgeau

(10) Patent No.: US 11,549,639 B2
(45) Date of Patent: Jan. 10, 2023

(54) MAGNETIC ROOFING APPARATUS

(71) Applicant: Green Link Holdings, LLC, Kalamazoo, MI (US)

(72) Inventor: Phillip C. Georgeau, Kalamazoo, MI (US)

(73) Assignee: Green Link Holdings, LLC, Kalamazoo, MI (US)

( * ) Notice: Subject to any disclaimer, the term of this patent is extended or adjusted under 35 U.S.C. 154(b) by 13 days.

(21) Appl. No.: 16/576,932

(22) Filed: Sep. 20, 2019

(65) Prior Publication Data

US 2020/0096155 A1 Mar. 26, 2020

Related U.S. Application Data

(60) Provisional application No. 62/846,978, filed on May 13, 2019, provisional application No. 62/736,118, filed on Sep. 25, 2018.

(51) Int. Cl.
| | |
|---|---|
| *F16M 13/02* | (2006.01) |
| *H02S 20/23* | (2014.01) |
| *F16L 3/24* | (2006.01) |
| *F24F 13/32* | (2006.01) |
| *H01Q 1/12* | (2006.01) |

(52) U.S. Cl.
CPC .............. *F16M 13/02* (2013.01); *F16L 3/24* (2013.01); *F24F 13/32* (2013.01); *H02S 20/23* (2014.12); *F16M 2200/08* (2013.01); *H01Q 1/1207* (2013.01)

(58) Field of Classification Search
CPC .......... F24F 13/32; H02S 20/22; H02S 20/23; H02S 20/24; H02S 20/25; H02S 20/26; H02S 20/30; H02S 20/32; F16M 13/02; F16M 2200/08; F16L 3/24; H01Q 1/1207
See application file for complete search history.

(56) References Cited

U.S. PATENT DOCUMENTS

| | | | | |
|---|---|---|---|---|
| 1,778,481 | A | * 10/1930 | Boucher | .............. G01B 5/0002 335/219 |
| 2,570,626 | A | 10/1951 | Abraham | |
| 3,440,758 | A | 4/1969 | Hackley | |
| 3,508,370 | A | 4/1970 | Riblet | |
| 4,038,804 | A | 8/1977 | Haage et al. | |
| 4,519,172 | A | 5/1985 | Ristow | |

(Continued)

FOREIGN PATENT DOCUMENTS

| | | | | |
|---|---|---|---|---|
| DE | 19963545 A1 | * 7/2001 | .............. H02S 20/24 |
| EP | 3650611 A4 | * 5/2020 | .............. F16B 11/006 |

(Continued)

OTHER PUBLICATIONS

OMG Roofing Products, OMG PowerGrip Roof Mount System, Rev. Jun. 2012 (2 pages).

(Continued)

*Primary Examiner* — Eret C McNichols
(74) *Attorney, Agent, or Firm* — Price Heneveld LLP

(57) ABSTRACT

A magnetic roofing attachment assembly utilizes a magnetic connecting arrangement to support rooftop equipment without mechanically penetrating a waterproof membrane of the roof. First and second members on opposite sides of waterproof barrier are magnetically coupled (connected) through the barrier to secure an external support for rooftop equipment.

23 Claims, 6 Drawing Sheets

(56) References Cited

U.S. PATENT DOCUMENTS

| | | | |
|---|---|---|---|
| 4,907,769 A * | 3/1990 | Hunley, Jr. | F21V 21/06 |
| | | | 248/185.1 |
| 4,977,720 A * | 12/1990 | Kuipers | B29C 65/02 |
| | | | 52/408 |
| 5,094,056 A | 3/1992 | Peters | |
| 5,182,890 A | 2/1993 | Peters | |
| 5,409,549 A * | 4/1995 | Mori | H02S 20/23 |
| | | | 136/244 |
| 5,609,317 A * | 3/1997 | Glynn | F16B 2/06 |
| | | | 248/206.5 |
| 5,930,969 A | 8/1999 | Mayle et al. | |
| 6,042,080 A * | 3/2000 | Shepherd | B60R 11/00 |
| | | | 248/163.1 |
| 6,739,567 B1 * | 5/2004 | Curtis | E01F 9/681 |
| | | | 248/519 |
| 7,360,334 B2 * | 4/2008 | Christiansen | A01K 77/00 |
| | | | 2/94 |
| 7,618,013 B2 * | 11/2009 | Elmer | G09F 21/04 |
| | | | 248/206.5 |
| 7,624,957 B2 * | 12/2009 | Klein | H01Q 1/1221 |
| | | | 248/206.5 |
| 8,020,517 B2 | 9/2011 | Seay | |
| 8,287,034 B2 * | 10/2012 | Smith | B60R 13/0206 |
| | | | 296/191 |
| 8,505,249 B2 | 8/2013 | Geary | |
| 8,567,423 B1 * | 10/2013 | Combs, Jr. | E04H 15/06 |
| | | | 135/120.3 |
| 8,615,852 B2 | 12/2013 | Smith et al. | |
| 8,704,623 B2 * | 4/2014 | Dumonski | H01B 13/01227 |
| | | | 335/285 |
| 8,714,511 B2 * | 5/2014 | Zoeteman | E04H 12/2238 |
| | | | 248/537 |
| 8,826,618 B2 | 9/2014 | Stearns | |
| 9,140,277 B2 | 9/2015 | McMillen et al. | |
| 9,153,152 B1 * | 10/2015 | Elmer | G09F 7/04 |
| 9,309,911 B1 * | 4/2016 | Powell | E04D 5/146 |
| 9,472,937 B2 * | 10/2016 | Klein | H02G 3/32 |
| 9,577,417 B2 * | 2/2017 | Stechmann | H02G 3/32 |
| 10,627,043 B2 * | 4/2020 | Wargo | F16M 13/02 |
| 10,954,676 B2 | 3/2021 | McBride et al. | |
| 2005/0224105 A1 * | 10/2005 | Yang | B60J 7/11 |
| | | | 135/88.07 |
| 2006/0099370 A1 | 5/2006 | Glass | |
| 2007/0266672 A1 * | 11/2007 | Bateman | F24S 20/67 |
| | | | 52/747.1 |
| 2009/0211621 A1 * | 8/2009 | LeBlanc | H01L 31/0392 |
| | | | 136/244 |
| 2010/0192505 A1 * | 8/2010 | Schaefer | E04B 1/66 |
| | | | 52/653.2 |
| 2012/0198779 A1 * | 8/2012 | Tachino | F24S 25/61 |
| | | | 52/173.3 |
| 2012/0233958 A1 * | 9/2012 | Stearns | E04G 21/328 |
| | | | 52/708 |
| 2013/0298494 A1 | 11/2013 | Corsi | |
| 2014/0060645 A1 | 3/2014 | Rummens | |
| 2014/0102556 A1 | 4/2014 | Malpas | |
| 2016/0040431 A1 * | 2/2016 | Stanley | F24S 25/61 |
| | | | 52/408 |
| 2016/0047494 A1 * | 2/2016 | Dickinson | F16B 1/00 |
| | | | 248/74.2 |
| 2016/0072426 A1 * | 3/2016 | Babineau, Jr. | H02S 20/24 |
| | | | 52/173.3 |
| 2016/0138833 A1 * | 5/2016 | Stephan | F24S 25/11 |
| | | | 248/224.8 |
| 2016/0176105 A1 * | 6/2016 | Stanley | F24F 13/32 |
| | | | 156/71 |
| 2017/0159880 A1 * | 6/2017 | Stechmann | H02G 3/30 |
| 2017/0183875 A1 * | 6/2017 | Ndobo-Epoy | E04D 13/1637 |
| 2017/0342737 A1 * | 11/2017 | Cooley | A45B 17/00 |
| 2017/0367306 A1 | 12/2017 | McCord et al. | |
| 2018/0243855 A1 | 8/2018 | Scheerer et al. | |
| 2019/0081587 A1 | 3/2019 | Mayfield et al. | |
| 2020/0096155 A1 | 3/2020 | Georgeau | |
| 2020/0299969 A1 * | 9/2020 | McBride | H05K 9/0075 |

FOREIGN PATENT DOCUMENTS

| | | | | |
|---|---|---|---|---|
| JP | | 5606958 B2 * | 10/2014 | |
| JP | | 5606959 B2 * | 10/2014 | |
| WO | WO-2013125391 A1 * | | 8/2013 | H02S 20/23 |

OTHER PUBLICATIONS

Magnet Mount for Solar Panels, https://blog.voltaicsystems.com/magnet-mount-for-solar-panels, Jan. 15, 2014 (9 pages).

Roof Solar Panels Installed Using New Magnet Method, https://www.japanfs.org/en/news/archives/news_id031488.html, retrieved from Wayback Machine, dated May 31, 2016 (2 pages).

* cited by examiner

MAGNETIC ROOFING APPARATUS

CROSS-REFERENCE TO RELATED APPLICATIONS

This application claims the benefit under 35 U.S.C. § 119(e) to U.S. Provisional Patent Application No. 62/736,118, filed on Sep. 25, 2018, and to U.S. Provisional Patent Application No. 62/846,978, filed on May 13, 2019, both of which are entitled "MAGNETIC ROOFING APPARATUS." The entire disclosures of each are incorporated herein by reference.

BACKGROUND OF THE INVENTION

Various types of rooftop equipment may be mounted to roofs utilizing fasteners that penetrate the roofing materials. However, known mounting arrangements may suffer from various drawbacks.

SUMMARY OF THE INVENTION

The present disclosure utilizes upper and lower retaining members positioned on opposite sides of a waterproof roof layer to secure items to a roof without mechanically penetrating the waterproof roof layer. The upper and lower retaining members are magnetically attracted to one another, and may comprise magnetic material and ferromagnetic material. The magnetic material may be positioned above or below the waterproof layer, and the ferromagnetic material may be positioned on an opposite side of the waterproof layer. Virtually any type of material in any combination or configuration may be positioned on opposite sides of the waterproof layer, provided the materials are capable of magnetic coupling through the membrane to thereby secure equipment to the roof. It will be understood that as used herein, the terms "magnetic material" and "ferromagnetic material" are not mutually exclusive, and ferromagnetic material may comprise magnetic material. Thus, magnetic coupling through the waterproof roof membrane may be accomplished using magnetic material on one or both sides of a waterproof membrane. Furthermore, it will be understood that the present disclosure is not limited to magnetic and ferromagnetic materials, and virtually any combination of materials having a magnetic attraction (force) may be utilized above and below a waterproof roof membrane. For example, paramagnetic materials may be utilized instead of ferromagnetic materials.

According to some aspects of the present disclosure, a method for magnetically attaching rooftop equipment is provided. The method may include positioning a ferromagnetic member such as a steel plate (or a magnet) on one side of a waterproof barrier of a roof. One or more magnets may be positioned on an opposite side of the waterproof barrier and the ferromagnetic member may be magnetically coupled to the one or more magnets through the waterproof barrier. The magnet (or magnets) of the ferromagnetic member may be connected to an external support structure that may be configured to support rooftop equipment. The ferromagnetic material may optionally be magnetized such that magnets are utilized on both sides of the waterproof barrier.

A method for magnetically attaching rooftop equipment according to another aspect of the present disclosure includes positioning one or more magnets on a first side of a waterproof barrier of a roof, and positioning a ferromagnetic member such as a steel plate (or additional magnets) on a second side of the waterproof barrier. The ferromagnetic member is magnetically coupled to the one or more magnets through the waterproof barrier. The ferromagnetic member is connected to an external support structure that may be configured to support rooftop equipment.

A magnetic rooftop support system according to another aspect of the present disclosure includes an attachment member having a base comprising a ferromagnetic member and/or at least one magnet, a support body connected to the base, and a connector positioned on an opposite side of a waterproof roof layer, wherein the connector is configured to be magnetically coupled to the ferromagnetic member and/or the at least one magnet through the waterproof roof layer.

A magnetic system for attaching equipment to a roof according to another aspect of the present disclosure includes ferromagnetic material that is magnetically configured to be coupled to one or more magnets on an opposite side of a waterproof barrier. The magnetic system may include a support structure that is configured to support roofing equipment.

A magnetic roofing attachment assembly according to another aspect of the present disclosure includes ferromagnetic material and an attachment member having a base coupled to a support body. One or more magnets are configured to couple the attachment member to a roof through a watertight roofing membrane.

A magnetic roofing attachment assembly according to another aspect of the present disclosure includes one or more magnets disposed on a first side of a watertight roofing membrane and ferromagnetic material disposed on a second side of the watertight roofing membrane. The assembly includes an attachment member having a base coupled to a support body. One or more magnets are configured to be magnetically coupled to the ferromagnetic material to retain the attachment member on a roof without penetrating the watertight roofing membrane.

A magnetic roofing attachment assembly according to another aspect of the present disclosure includes a first connector comprising ferromagnetic or magnetic material positioned between a first watertight roofing membrane and a second watertight roofing membrane. The assembly further includes an attachment member having a base coupled to a support body. The base includes at least a second connector that is configured to magnetically couple the base to the first connector without penetrating the second watertight roofing membrane of the roof.

A method for attaching equipment to a roof having watertight roofing membrane according to another aspect of the present disclosure includes positioning ferromagnetic material adjacent to a watertight roofing membrane. An attachment member is magnetically coupled to the ferromagnetic material, and equipment is positioned on the attachment member.

Another aspect of the present disclosure is a method for magnetically attaching rooftop equipment. The method includes positioning one of a magnet and a ferromagnetic member below a waterproof barrier on a roof, positioning the other of a magnet and a ferromagnetic member above the waterproof barrier, magnetically coupling the ferromagnetic member and the magnet through the waterproof barrier, wherein at least one of the ferromagnetic member and the magnet is coupled to an external support system that is configured to support rooftop equipment. The ferromagnetic member may, optionally, comprise a steel plate. The magnet may, optionally, comprise a plurality of magnets. The waterproof barrier may, optionally, comprise at least one of a roofing membrane, a plurality of roofing tiles, a barrier coating, a waterproof barrier, or a combination thereof. The external support system may, optionally, comprise a base, an attachment member, and a support body. The one or more magnets may, optionally, be secured to a structural roof deck. The method may, optionally, include causing the magnet and the ferromagnetic member to be magnetically decoupled, and magnetically recoupling the ferromagnetic member to the one or more magnets through the waterproof barrier to reposition the external support system.

These and other features, advantages, and objects of the present invention will be further understood and appreciated by those skilled in the art by reference to the following specification, claims, and appended drawings.

BRIEF DESCRIPTION OF THE DRAWINGS

The following is a description of the figures and the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
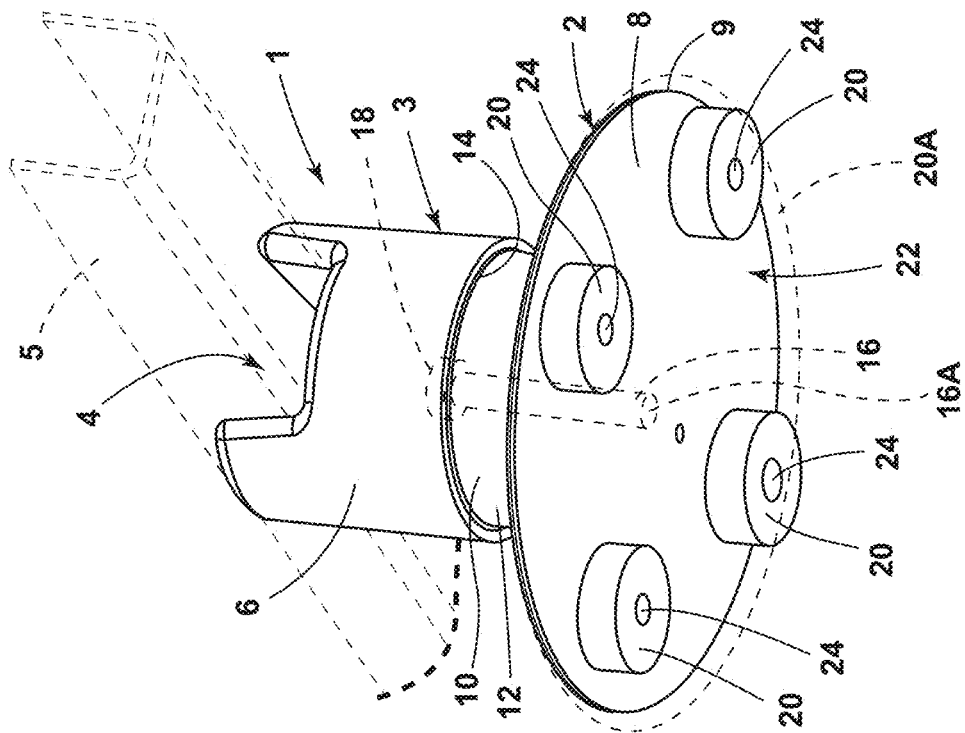
FIG. 1 is an isometric view of a rooftop support according to one aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a device is described as elements A, B, and/or C, the device can contain A alone; B alone; C alone; A and B in combination without C; A and C in combination without B; B and C in combination without A; or A, B, and C in combination, or more than one of each elements (e.g. AA alone, BB alone, CC alone, AAB in combination without C, ABB in combination without C, etc.).

As used herein, "comprises at least one of," "including at least one of," "including one or more of," and all other open phrases followed by a list of items, features, or category (e.g. "at least one of A, B, or C," or "at least one of A, B, and C," "one or more of A, B, or C," or "one or more of A, B, and C") means at least one A by itself (e.g. A, AA, AAA, etc.), at least one B by itself (e.g. B, BB, BBB, etc.), at least one C by itself (e.g. C, CC, CCC, etc.), or any combination thereof (e.g. AB, AC, BC, ABC, AAB, ABB, AABB, AAC, ACC, AACC, BBC, BCC, BBCC, AABC, ABBC, ABCC, AABBC, AABBCC, ABBCC, AABCC, etc.).

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principals of patent law, including the doctrine of equivalents.

For purposes of this disclosure, the term "coupled" (in all its forms: couple, coupling, coupled, etc.) generally means the joining or connecting of two components directly or indirectly to one another. Such joining may be stationary in nature, or moveable in nature. Such joining may be achieved with the two components and any additional intermediate members being integrally formed as a single unitary body with one another or with the two components. Such joining may be permanent in nature, or may be removable or releasable in nature, unless otherwise stated.

Figure 2:
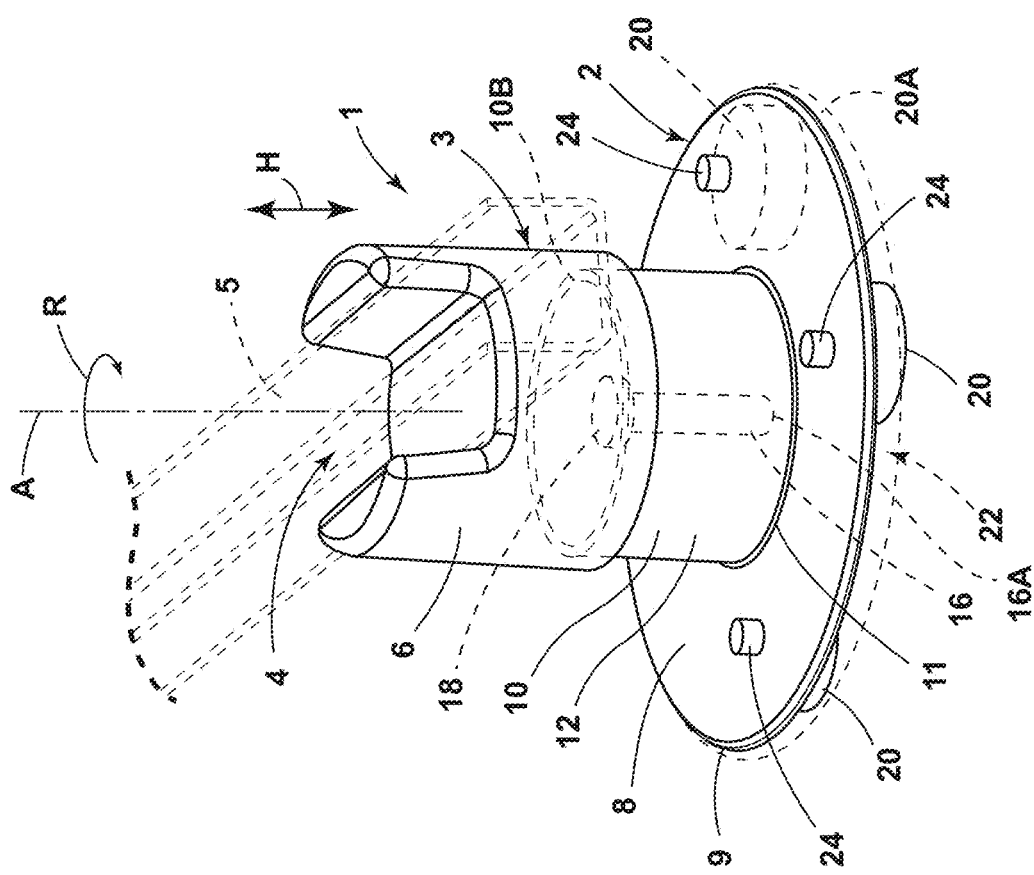
FIG. 2 is an isometric view of the rooftop support of FIG. 1.

With reference to FIGS. 1 and 2, a rooftop support 1 according to one aspect of the present disclosure includes a base 2 and a support body or member 3. Base 2 and support member 3 may be integrally formed, or the base 2 and support member 3 may comprise separate components. The support member 3 may include an upwardly-opening channel 4 or other suitable connecting feature that is configured to engage a structure 5. Structure 5 may comprise a rail, channel, pipe, frame member, bracket, or other structure to be mounted above a roof of a building. As discussed in more detail below, rooftop support 1 includes one or more magnets (e.g. magnets 20) that enable the rooftop support 1 to be secured to a roof structure 15 without penetrating a roof membrane.

In general, the present disclosure utilizes magnetic material and ferromagnetic material positioned on opposite sides of a waterproof roof membrane to form connecting members that secure equipment to a roof without mechanically penetrating the membrane. As discussed in more detail below, in connection with FIGS. 3-5, a first connecting member may be positioned below a waterproof barrier, and a second connecting member may be positioned above the waterproof barrier in registry with the first connecting member. At least one of the first and second connecting members comprises a magnetic material that is magnetically attracted to the material of the other of the first and second connectors through the waterproof membrane to retain the second connecting member above the waterproof barrier. As shown in FIG. 6, base 2 may include one or more magnets 20 to attach base 2 directly to a steel roof structure 35.

As discussed in more detail below in connection with FIG. 7, the rooftop support 1 may be utilized to secure various items such as a solar panel 40, pipes 45A, 45B, a heating or cooling (HVAC) unit 50, an antenna such as satellite dish 55, or other commercially available items to a roof structure 15. The support member 3 may be substantially similar to an upper part of a "KnuckleHead"™ support that is available from Green Link Company of Kalamazoo, Mich. In contrast to the magnetically attached base 2 described herein, prior supports utilize a disk-shaped polymer base (not shown) with fastener openings to permit the disk-shaped base to be secured to a roof structure by driving threaded fasteners (e.g. self-drilling screws) through the openings in the base, through a waterproof membrane, and into a steel roof deck. Prior disk-shaped bases (not shown) may also be adhesively bonded to a roof surface.

Base 2 may include a flange or plate structure 8 having a perimeter 9. Perimeter 9 may be substantially circular, or it may have other shapes. Base 2 further includes an upwardly-extending portion 10 that may be integrally formed with flange structure 8. Alternatively, the upwardly-extending portion 10 may be joined to the flange structure 8 at a joint 11. The upwardly-extending portion 10 may have a cylindrical outer surface 12, and the upwardly-extending portion 10 may be received in a downwardly-facing opening 14 (FIG. 2) of support member 3. The opening 14 of support member 3 may comprise a cavity having a cylindrical inner wall surface with a diameter that is slightly larger than a diameter of the cylindrical outer surface 12 of upwardly-extending portion 10. Support member 3 may have a generally cylindrical outer surface 6. However, it will be understood that the present disclosure is not limited to any specific geometry, and the configurations and shapes of the components of the rooftop support 1 described herein are merely examples according to some aspects of the present disclosure. The base 2 and support member 3 may be made from metals, polymers, or other suitable materials or combinations of materials as may be required for a particular application. For example, base 2 and support member 3 may comprise, in whole or in part, injection molded nylon 66 that is about 33% glass fiber reinforced.

Base 2 may include an attachment member such as upwardly-extending threaded rod 16 that engages a threaded opening 18 of support member 3 to thereby threadably interconnect the base 2 with the support member 3. If support member 3 comprises a polymer material, threaded opening 18 may comprise a threaded metal insert that is fixed (e.g. molded into) to the polymer material. Upwardly-extending portion 10 may have a generally tubular construction with an open upper end 10B as shown in FIGS. 3-6. The engagement of threaded rod 16 with threaded opening 18 permits vertical adjustment of the position of support member 3 relative to base 2 as shown by the arrow "H" (FIG. 1) upon rotation of support member 3 about axis "A" relative to base 2 as shown by the arrow "R." The angular position of support member 3 relative to base 2 can also be adjusted by rotating support member 3 about axis "A" relative to base 2 to thereby align a connecting feature (e.g. channel 4) of support member 3 with a structure 5. A lower end 16A of threaded rod 16 may be fixed (e.g. welded) to plate 8 of base 2 such that threaded rod 16 rotates with base 2, and vertical forces acting on threaded rod 16 at threaded opening 18 are transmitted through threaded rod 16 to base 2.

Referring again to FIGS. 1 and 2, base 2 further includes magnetic material such as one or more magnets 20 disposed on a lower side 22 of base 2. In the illustrated example, magnets 20 comprise permanent magnets having a generally cylindrical shape wherein the magnets 20 are secured to the base 2 by connectors 24. Connectors 24 may comprise pins, threaded connectors, or other suitable connecting arrangement. It will be understood that one or more magnets 20 having virtually any suitable configuration, size, and strength may be utilized. For example, a single large magnet 20A (dashed lines) that is generally disk-shaped may be utilized.

Magnets 20 may be selected to provide a desired magnetic attraction (coupling) force to a ferromagnetic member or plate 25 (FIGS. 3-5) or to a steel roof structure 35 (FIG. 6) through a waterproof roof membrane/layer 30 to securely retain rooftop equipment as required for a particular application. For example, each magnet 20 may be configured to generate a force in the range of about 50-200 pounds when magnets 20 are in direct contact with ferromagnetic material (e.g. steel). However, if the magnets 20 are separated from a metal plate 25 (FIG. 3) by the waterproof roofing membrane 30, the magnets 20 may have a somewhat reduced force. Thus magnets 20 are selected/configured to provide adequate strength when rooftop support 1 is utilized in connection with a roof membrane 30. For example, a typical roof membrane 30 may comprise an elastomeric material having a thickness of about 0.040 inches to about 0.060 inches, which typically reduces the holding force of magnets 20 to plate 25 by about one-third. Thus, if a particular application requires each magnet 20 to have a retaining force of 80 pounds, magnets 20 may be selected to have a nominal holding force of 120 pounds when in direct contact with steel or other ferromagnetic material. It will be understood that the size, configuration, and strength of a magnet or magnets 20 may vary as required for a particular application, and the present disclosure is not limited to any particular shape, size, strength, material, magnetic strength, etc. Furthermore, it will be understood that plate 25 may comprise magnetic material, and plate 25 may comprise a plurality of individual members or components. Roof membrane 30 may comprise virtually any suitable material of any suitable thickness and the present disclosure is not limited to the examples discussed above. More specifically, the membrane 30 may comprise a material that is not elastomeric, and the membrane could have a thickness that is less than 0.040 inches or greater than 0.060 inches.

Figure 3:
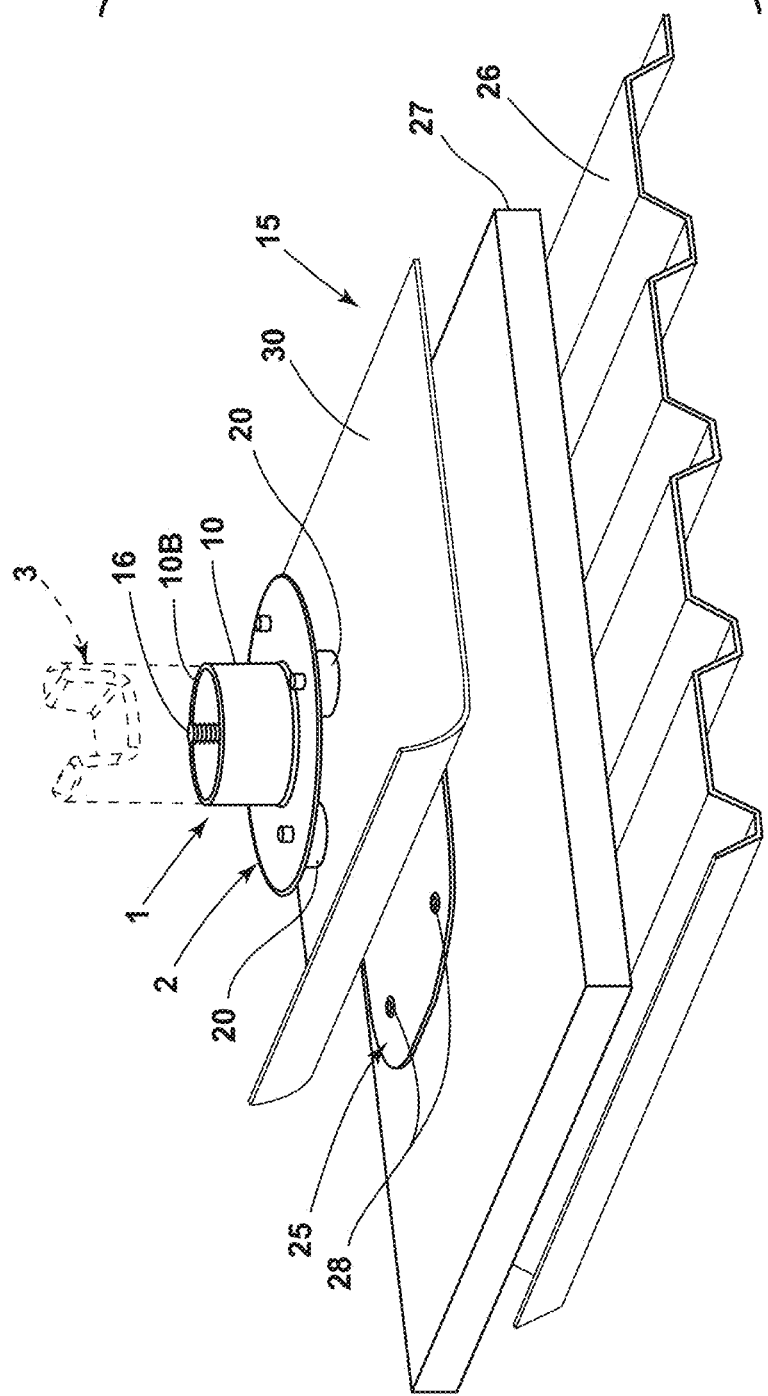
FIG. 3 is a partially fragmentary exploded isometric view of a rooftop support and roof structure according to one aspect of the present disclosure.

With reference to FIG. 3, a roof structure 15 may include a roof deck 26, an insulation layer 27, and a waterproof membrane 30 disposed over the layer of insulation 27. Roof deck 26 may comprise conventional corrugated metal or other suitable material, and insulation 27 may comprise a sheet or layer of isocyanate foam or other suitable material. Insulation 27 may comprise virtually any suitable insulation material, and may be in the form pre-formed sheets, sprayed-on insulation, or other suitable material/process. Furthermore, it will be understood that the insulation 27 is optional and the roof structure 15 does not necessarily include a layer of insulation. Membrane 30 may comprise virtually any suitable material such as a flexible membrane of a known type. Ferromagnetic member 25 may comprise a non-magnetized steel plate or other suitable structure to which magnets 20 are magnetically attracted, or it may comprise magnetic material. One or more mechanical fasteners 28 (e.g. screws or other suitable fasteners) may be utilized to secure ferromagnetic member 25 to the roof deck 26.

During assembly of roof structure 15, insulation 27 is positioned over the roof deck 26, and the ferromagnetic member 25 is then secured by driving mechanical fasteners 28 through insulation 27 into the roof deck 26. The membrane 30 is then positioned over the ferromagnetic member 25, and the base 2 is then positioned on top of the membrane 30 with magnets 20 in close proximity to the ferromagnetic member 25 below the membrane 30. This causes the magnets 20 to be magnetically coupled to ferromagnetic member 25 without mechanically penetrating waterproof membrane 30. This permits secure attachment to the roof while reducing or eliminating problems (e.g. leaking) that may occur if membrane 30 were to be penetrated by mechanical fasteners or the like. A suitable support member 3 is then secured to the base 2 by threadably engaging the support member 3 with the threaded rod 16. The support member 3 may be configured to support various rooftop items as shown in FIG. 7. The location of the ferromagnetic member 25 may be marked on membrane 30 at the time membrane 30 is positioned over the ferromagnetic member 25. Alternatively, the location of ferromagnetic member 25 can be located utilizing a magnet moved over the surface of membrane 30. It will be understood that magnetic coupling through waterproof membrane 30 may be accomplished utilizing magnets positioned above or below membrane 30 with additional magnets and/or non-magnetized ferromagnetic material positions on the other side of the waterproof membrane.

Figure 4:
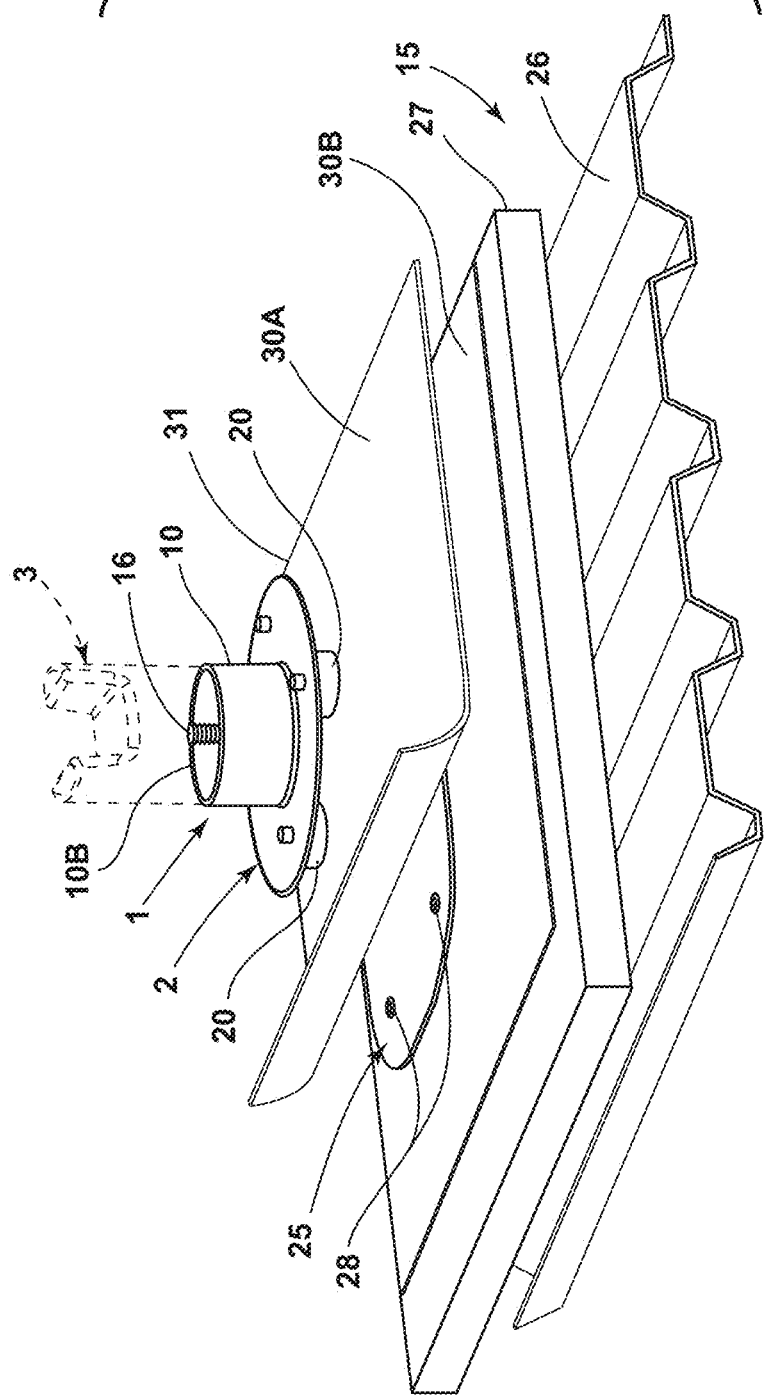
FIG. 4 is a partially fragmentary exploded isometric view of a rooftop support and roof structure according to another aspect of the present disclosure.

With further reference to FIG. 4, ferromagnetic member 25 may, alternatively, be positioned over a roof membrane 30B, and fasteners 28 may be driven through membrane 30B and insulation 27 into roof deck 26. An additional layer of roof membrane material 30A may then be positioned over ferromagnetic member 25, and a peripheral edge portion 31 of membrane 30A may then be sealed to membrane 30B to provide a watertight seal. Roofing membranes 30A and 30B may comprise commercially available membranes that are sealed utilizing known techniques. For example, upper membrane 30A may be substantially similar to a patch, and may be sealed to membrane 30B utilizing conventional patching techniques (e.g. adhesive) as specified by a particular membrane manufacturer for patching roof membrane 30B. The base 2 is then positioned over membrane 30A with magnets 20 directly adjacent the ferromagnetic member 25. The base 2 is thereby retained due to the magnetic attraction (coupling) of magnets 20 and ferromagnetic member 25 through the waterproof membrane 30A.

Figure 5:
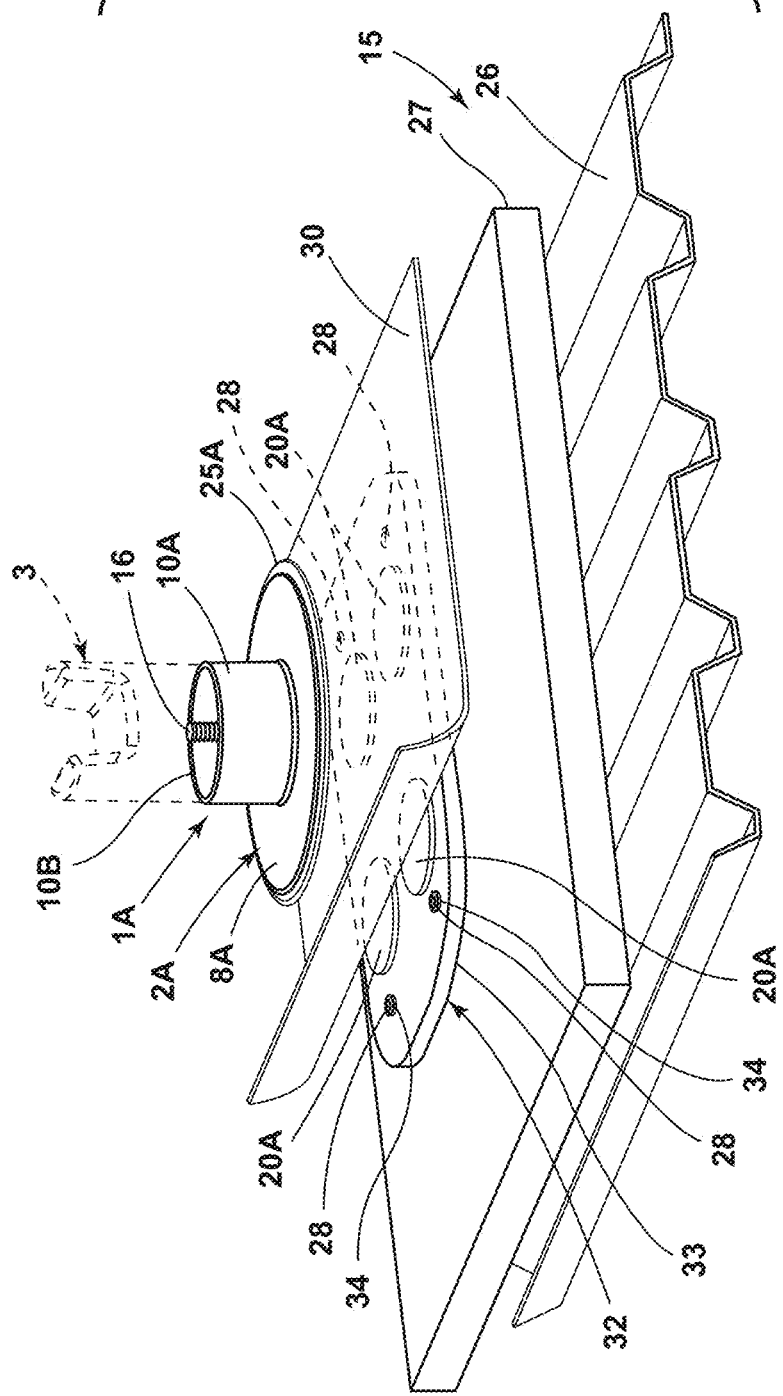
FIG. 5 is a partially fragmentary exploded isometric view of a rooftop support and roof structure according to another aspect of the present disclosure.
Figure 6:
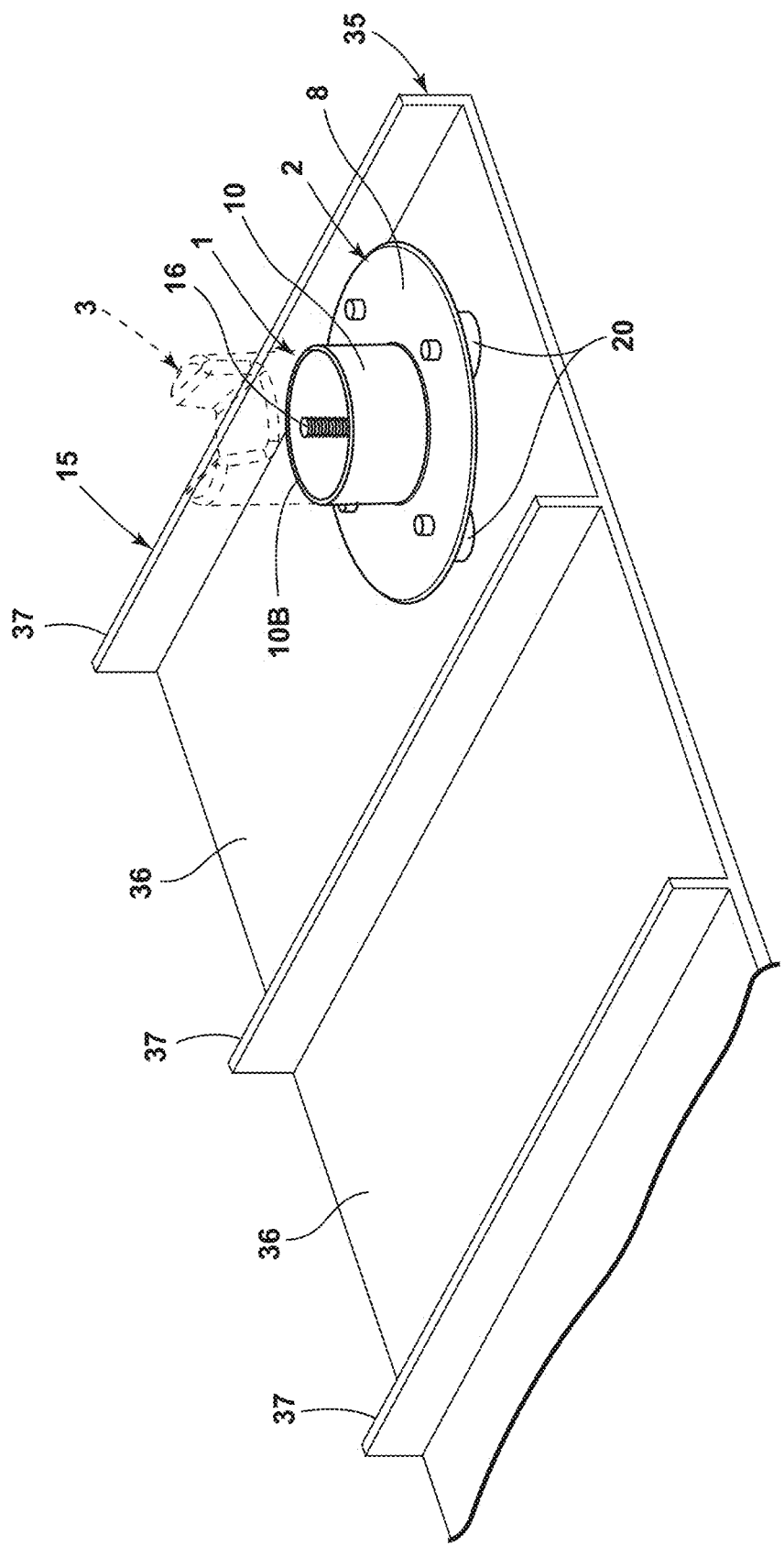
FIG. 6 is a partially fragmentary isometric view of a rooftop support and roof structure according to another aspect of the present invention.

With further reference to FIG. 5, a rooftop support 1A according to another aspect of the present disclosure includes a flange structure 8A and an upwardly-extending portion 10A. These structures may have configurations that are somewhat similar to the corresponding features of base 2 (FIGS. 1 and 2). However, base 2A includes a ferromagnetic member 25A that is configured to be utilized in connection with a magnet 32 positioned below a membrane 30. It will be understood that the ferromagnetic member 25A may be integrally formed with the base 2A, or it may comprise a separate member that is secured to the flange 8A or other portion of base 2A. Magnet assembly 32 may comprise, for example, a support such as plate 33 that retains one or more magnets 20A. The plate 33 may include a plurality of openings 34 that receive threaded fasteners 28. During assembly, the threaded fasteners 28 are inserted into opening 34, and driven into roof deck 26 to thereby secure the magnet assembly 32 to the roof deck 26.

With further reference to FIG. 6, rooftop support 1 may also be utilized to secure rooftop equipment to a steel roof structure 35. In the illustrated example, the steel roof structure 35 includes planar web or wall portions 36 and ribs 37. Ribs 37 may comprise "standing seams" of a known type. However, it will be understood that the steel roof 35 may have virtually any configuration. If rooftop support 1 is used to secure rooftop items to a steel roof structure 35, the magnets 20 may be brought into direct contact with the steel roof structure 35, and a support member 3 may be utilized to support the rooftop elements.

It will be understood that the present disclosure is not limited to the magnets, supports, and roof structures of FIGS. 2-6, and virtually any type of support and magnetic coupling arrangement through a waterproof membrane may be utilized as required for a particular application.

Figure 7:
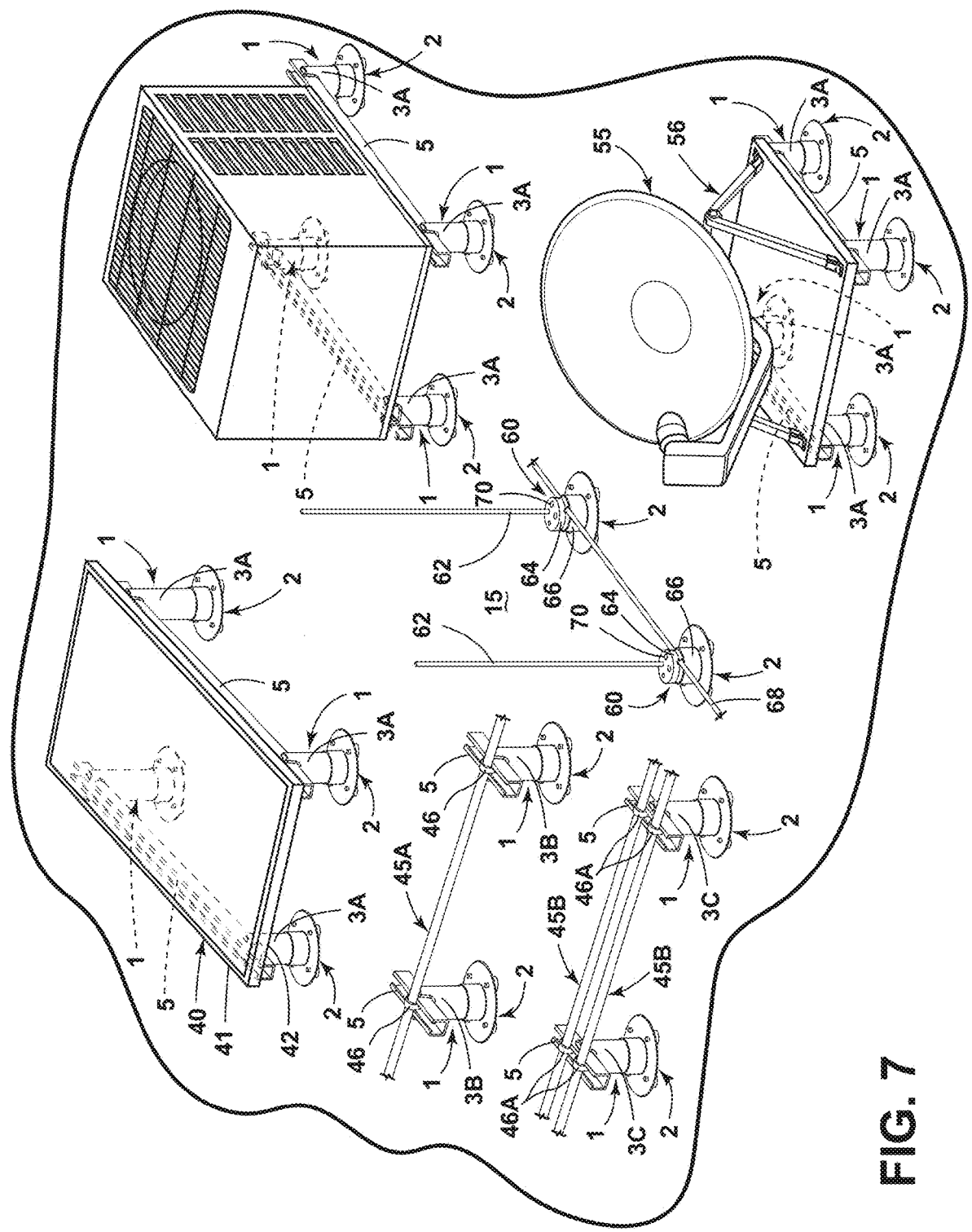
FIG. 7 is an isometric view showing various items mounted to a roof utilizing rooftop supports.

With further reference to FIG. 7, the rooftop support 1 may be utilized to secure various items to a roof structure 15 without penetrating the roof structure 15. It will be understood that the roof structure 15 may comprise virtually any roof structure. For example, roof structure 15 may include a membrane 30 (e.g. FIGS. 3-5) or it may comprise a metal roof (e.g. FIG. 6).

A solar panel 40 may be secured to roof structure 15 utilizing a plurality (e.g. four) rooftop supports 1 and bases 2 and a perimeter support structure 5 that engages support members 3A. Extensions 42 may be utilized to support an edge 41 of solar panel 40 at a raised position if required. Extension 42 may optionally comprise a tubular member or structure. For example, suitable extensions are available commercially for use with "KnuckleHead"™ supports available from Green Link Company of Kalamazoo, Mich.

The rooftop supports 1 (with bases 2) may also be utilized to support a large pipe 45A utilizing suitable support members 3B. Optional straps 46 may be utilized to secure the pipe 45A to the support member 3B.

Support members 3C (with bases 2) may be utilized to support a plurality of smaller pipes 45B, and straps 46A may be secured to the support members 3C to thereby secure the pipes 45B to the support members 3C.

It will be understood that pipes 45A and 45B may have virtually any configuration and length as required for a particular application, and the present disclosure is not limited to the examples described and shown herein.

A heating and/or air conditioning (HVAC) unit 50 may also be secured to a roof structure 15 utilizing rooftop supports 1 having bases 2. In the illustrated example, a frame 52 comprises rails or structural members 5 that are received in support members 3A.

Rooftop supports 1 (including bases 2) may also be utilized to secure an antenna or satellite dish 55 to roof structure 15. A frame 56 comprises a plurality of structural members 5 that engage support members 3A.

One or more lightning rod assemblies 60 may be utilized to secure upright conductive (e.g. metal) lightning rods 62 to a roof structure 15. Each lightning rod assembly 60 includes a base 2 with magnets, and upper and lower clamp members 64 and 66, respectively, that clamp together onto an electrically conductive (e.g. metal) ground cable or line 68. Clamp members 64 and 66 may be configured to clamp onto ground line 68 upon tightening of threaded fasteners 70. A relatively large number of lightning rod assemblies 60 may be interconnected to one or more ground lines 68 to provide the required lightning protection. For example, lightning rod assemblies 60 may be positioned in a grid pattern at a desired spacing of 10 feet, 12 feet, or other distance. Ground line 68 may be grounded in a known manner.

It will be understood that the rooftop supports 1 and support members 3A, 3B, and 3C of FIG. 7 and the related mounting structures 5 are merely examples of magnetic coupling arrangements and supports, and the present disclosure is not limited to any specific shape or configuration of these features. Furthermore, the number of rooftop supports 1 utilized for a particular application may vary.

The rooftop support 1 of the present disclosure provides a way to secure rooftop equipment and other items to a low slope or sloped roof without utilizing fasteners that mechanically penetrate a waterproof roof layer. Also, the rooftop supports 1 may be magnetically disconnected and moved if required. Specifically, if a support 1 needs to be moved, sufficient force to release magnets 20 from the ferromagnetic member 25 can be applied, and the rooftop support 1 can then be moved. If necessary, a new ferromagnetic member 25 can be installed at a new location, and the base 2 of the rooftop support 1 can be magnetically connected to the ferromagnetic member 25 at the new location. If required, a smaller membrane patch (e.g. membrane 30A, FIG. 4) can be applied over the ferromagnetic member 25 at the new location.

It will be understood by one having ordinary skill in the art that construction of the described device and other components may not be limited to any specific material. Other exemplary embodiments of the device disclosed herein may be formed from a wide variety of materials, unless described otherwise herein. For example, virtually any materials or combinations of materials providing sufficient magnetic attraction forces may be utilized to secure rooftop items through a waterproof layer or membrane.

For purposes of this disclosure, the term "coupled" (in all of its forms, couple, coupling, coupled, etc.) generally means the joining and/or connecting of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A method for magnetically attaching rooftop equipment to a roof structure of a building having a deck structure and a waterproof roof barrier overlying at least a portion of the deck structure, the method comprising:
    securing a first connecting member to the deck structure using mechanical fasteners;
    causing the first connecting member to be positioned between the deck structure and the waterproof roof barrier, with at least a portion of the waterproof roof barrier extending beyond a peripheral edge of the first connecting member such that at least a portion of the waterproof roof barrier does not overlie the first connecting member;
    positioning a second connecting member above the waterproof roof barrier in registry with the first connecting member;
    magnetically interconnecting the first and second connecting members through the waterproof roof barrier whereby the second connecting member is retained above the waterproof roof barrier by the magnetic interconnection through the waterproof roof barrier;
    operably connecting the second connecting member to a height adjustable external support system configured to fixedly support rooftop equipment at a selected one of a plurality of vertical positions relative to the roof structure; and
    adjusting a vertical position of the rooftop equipment utilizing the external support system to fixedly support the rooftop equipment at the selected vertical position.

2. The method of claim 1, wherein:
    the mechanical fasteners comprise screws extending through openings in the first connecting member;
    the second connecting member comprises at least one magnet, and the first connecting member comprises a ferromagnetic material.

3. The method of claim 1, wherein:
    the waterproof roof barrier comprises a preformed sheet of elastomeric material having a thickness of about 0.040 inches to about 0.060 inches.

4. The method of claim 1, wherein:
    the deck structure comprises a flat sheet of foam insulation disposed on a corrugated metal structure; and
    a lower side of the first connecting member contacts an upwardly-facing surface of the flat sheet of foam insulation, and a first portion of a lower surface of the waterproof barrier contacts an upwardly-facing surface of the first connecting member, and a second portion of the lower surface of the waterproof barrier contacts the upwardly-facing surface of the flat sheet of foam insulation.

5. The method of claim 1, including:
    disconnecting the first and second connecting members by moving the second connecting member away from the first connecting member followed by:

magnetically interconnecting the first and second connecting members through the waterproof roof barrier to reposition the external support system.

6. A method for magnetically attaching rooftop equipment, the method comprising:
positioning a first connecting member below a waterproof roof barrier;
positioning a second connecting member above the waterproof roof barrier in registry with the first connecting member;
magnetically interconnecting the first and second connecting members through the waterproof roof barrier whereby the second connecting member is retained above the waterproof roof barrier by the magnetic interconnection through the waterproof roof barrier;
operably connecting the second connecting member to an external support system configured to support rooftop equipment;
the first connecting member comprises a steel plate; and including:
mechanically securing the steel plate to a structural roof deck utilizing screws;
followed by positioning the waterproof roof barrier over the steel plate.

7. A method for magnetically attaching rooftop equipment, the method comprising:
positioning a first connecting member below a waterproof roof barrier;
positioning a second connecting member above the waterproof roof barrier in registry with the first connecting member;
magnetically interconnecting the first and second connecting members through the waterproof roof barrier whereby the second connecting member is retained above the waterproof roof barrier by the magnetic interconnection through the waterproof roof barrier; and
operably connecting the second connecting member to an external support system configured to support rooftop equipment;
wherein the waterproof roof barrier comprises a first waterproof roof membrane;
and wherein the first connecting member comprises a steel plate; and including:
positioning the steel plate over a second waterproof roof membrane;
followed by securing the steel plate to a structural roof deck by driving mechanical fasteners through the second waterproof roof membrane;
followed by positioning the first waterproof roof membrane over the steel plate.

8. A low slope roof system of a building, comprising:
a roof deck structure having an upwardly-facing upper side;
a first connecting member positioned on the upper side of the roof deck structure;
mechanical fasteners securing the first connecting member to the roof deck structure;
a waterproof barrier covering at least a portion of the first connecting member;
a second connecting member positioned above the waterproof barrier; and
a support body adjustably coupled to the second connecting member whereby a support surface of the support body can be fixed at a selected one of a plurality on non-equal vertical positions relative to the second connecting member;
wherein the first and second connecting members are magnetically coupled to each other through the waterproof barrier.

9. The low slope roof system of claim 8, wherein:
the mechanical fasteners comprise screws;
the support body includes an upwardly-opening channel that is configured to support rooftop equipment.

10. The low slope roof system of claim 9, wherein:
the second connecting member comprises a base having one or more magnets positioned adjacent to a bottom surface of the base.

11. The roof system of claim 8, wherein:
the first connecting member comprises one or more magnets.

12. A roof system, comprising:
a first connecting member;
a waterproof barrier covering at least a portion of the first connecting member;
a second connecting member positioned above the waterproof barrier;
wherein the first and second connecting members are magnetically coupled to each other through the waterproof barrier;
a support body coupled to the second connecting member above the waterproof barrier, wherein the support body is configured to support rooftop equipment;
wherein the support body includes at least one upwardly-opening channel configured to support rooftop equipment, a downwardly-facing opening, and a threaded opening;
wherein the base includes a flange and an upwardly-extending portion having a cylindrical outer surface that is at least partially received within the downwardly-facing opening of the support body; and including:
a threaded rod threadably engaging the threaded opening and adjustably interconnecting the base and the support body whereby a vertical position of the support body above the base can be adjusted by rotating the support body relative to the base.

13. A method for attaching equipment to a roof of a building, the roof having ferromagnetic material disposed below a horizontally-extending waterproof barrier, a sheet of insulation below the ferromagnetic material, and a deck structure below the sheet of insulation, the method comprising:
utilizing mechanical fasteners extending through the sheet of insulation to secure the ferromagnetic material to the deck structure;
magnetically coupling one or more magnets of an attachment to the ferromagnetic material of the roof through the horizontally-extending waterproof barrier without extending a mechanical connector through the horizontally-extending waterproof barrier; and
positioning equipment on the attachment, wherein the equipment comprises one or more of a pipe, or a conduit, or a HVAC unit, or combinations thereof.

14. A magnetic roof attachment kit configured to support items on an upwardly-facing side of a building roof structure having a deck structure, comprising:
a metal plate having a plurality of openings that are configured to receive mechanical fasteners to secure the metal plate to the deck structure above the deck structure;
a base having an upper portion and a lower portion, the lower portion including a magnet that is designed and configured to be magnetically coupled to the metal plate on the upwardly-facing side of the building roof structure;

a support body threadably coupled to the base, whereby a vertical position of the support body relative to the base and the building roof structure can be adjusted by rotating the support body relative to the base;

wherein the support body comprises an upwardly-opening recess that is configured to support an item above the base and the building roof structure; and at least one item at least partially disposed in the upwardly-opening recess above the building roof structure, wherein the at least one item is selected from the group consisting of a pipe, a conduit, a solar array, a HVAC unit, a lightning rod, or combinations thereof.

15. The magnetic roof attachment kit of claim 14, wherein:

the lower portion of the base comprises a flange that projects outwardly from the upper portion; and the magnet comprises a plurality of magnets disposed on a lower side of the flange.

16. The magnetic roof attachment kit of claim 15, wherein:

the flange has a circular peripheral edge;

the upper portion is tubular and extends upwardly above the flange.

17. A roof system including the magnetic roof attachment assembly of claim 14, the roof system comprising:

ferromagnetic material; and wherein:

the magnet is magnetically coupled to the ferromagnetic material.

18. A magnetic roof attachment assembly, comprising:

a base having an upper portion and a lower portion, the lower portion including a magnet that is designed and configured to be magnetically coupled to the upwardly-facing side of the building roof structure;

a support body threadably coupled to the base, whereby a vertical position of the support body relative to the base and the building roof structure can be adjusted by rotating the support body relative to the base;

wherein the support body comprises an upwardly-opening recess that is configured to support an item above the base and the building roof structure;

at least one item at least partially disposed in the upwardly-opening recess above the building roof structure, wherein the at least one item is selected from the group consisting of a pipe, a conduit, a solar array, a HVAC unit, a lightning rod, or combinations thereof;

wherein the lower portion of the base comprises a flange that projects outwardly from the upper portion;

wherein the magnet comprises a plurality of magnets disposed on a lower side of the flange;

wherein the upper portion is tubular and extends upwardly above the flange; and wherein the flange has a circular peripheral edge.

19. A magnetic roof attachment assembly, comprising:

a base having an upper portion and a lower portion, the lower portion including a magnet;

a support body threadably coupled to the base, whereby a vertical position of the support body relative to the base can be adjusted by rotating the support body relative to the base;

wherein the support body comprises an upwardly-opening recess that is configured to support an item above the base;

wherein the lower portion of the base comprises a flange that projects outwardly from the upper portion;

wherein the magnet comprises a plurality of magnets disposed on a lower side of the flange;

wherein the upper portion is tubular and extends upwardly above the flange;

wherein the flange has a circular peripheral edge;

wherein the support body is configured to support, above the base, at least one item selected from the group consisting of a pipe, a conduit, a solar array, a HVAC unit, a lightning rod, or combinations thereof;

wherein the support body includes a cylindrical opening; and wherein the upper portion of the base has a cylindrical outer surface that is closely received in the cylindrical opening.

20. A roof system comprising:

a low-slope building roof structure having a deck structure, a sheet of insulation above the deck structure, a metal plate above the sheet of insulation, a flexible waterproof membrane above the metal plate, and an upwardly-facing portion; and a support above the waterproof membrane, wherein the support is magnetically interconnected to the metal plate through the waterproof membrane, and wherein the support includes at least one upwardly-opening channel that is configured to support a rooftop accessory above the upwardly-facing portion of the roof structure.

21. The roof system of claim 20, wherein:

the metal plate is disposed on an upper side of the sheet of foam insulation; and the support includes a base having at least one magnet.

22. The roof system of claim 20, wherein:

the flexible waterproof membrane comprises a sheet of pre-formed elastomeric material having a thickness of about 0.040 inches to about 0.060 inches.

23. A roof system, comprising:

a roof structure;

a support magnetically interconnected to the roof structure, wherein the support is configured to support a rooftop accessory above the roof structure;

wherein the roof structure comprises a metal plate;

wherein the support includes a base having at least one magnet and including:

a waterproof membrane disposed between the metal plate and the magnet;

a lower waterproof membrane disposed below the metal plate;

a deck structure disposed below the lower waterproof membrane; and mechanical fasteners extending through the metal plate and the lower waterproof membrane into the deck structure.

* * * * *